UNITED STATES PATENT OFFICE.

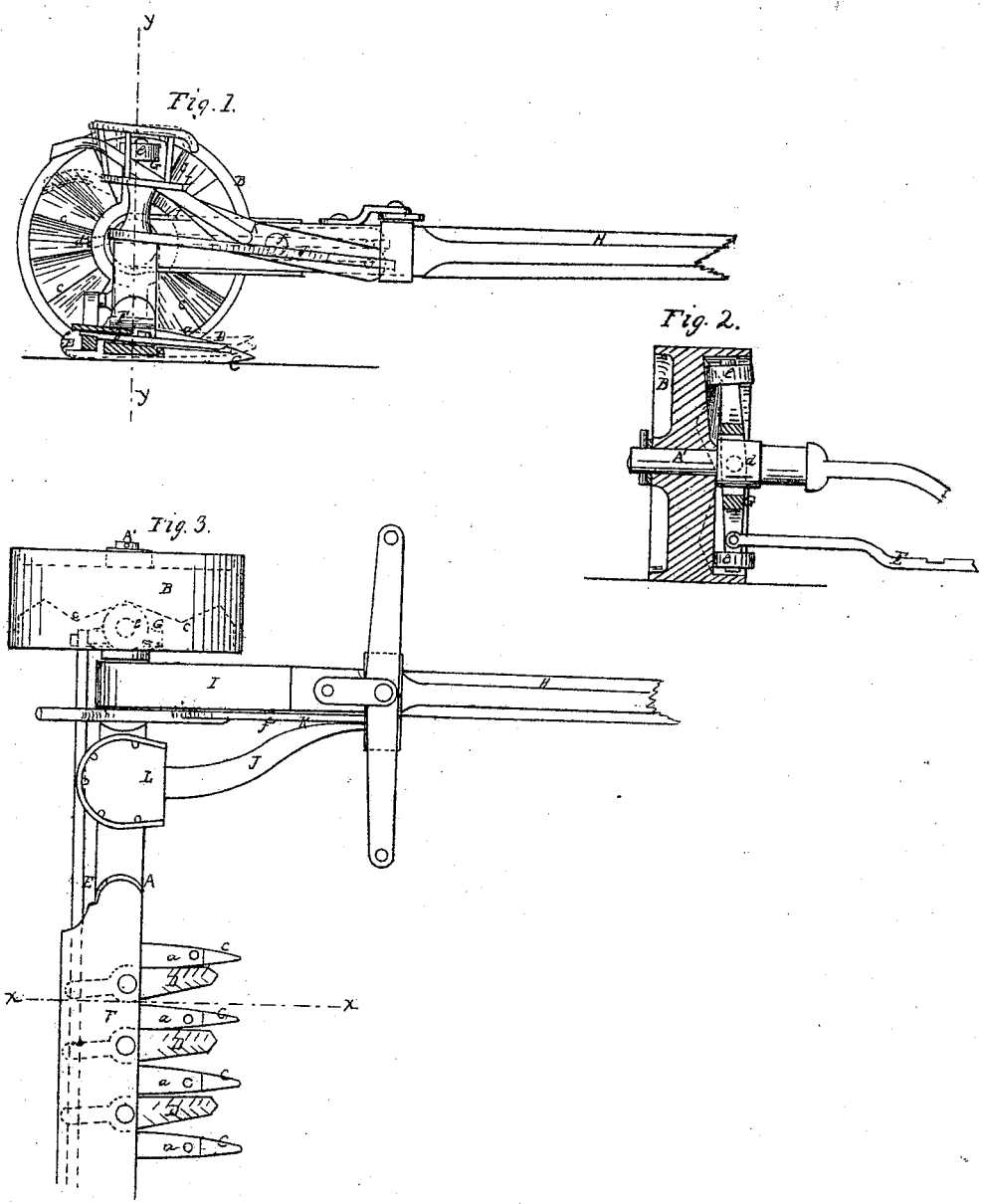
A. B. Wilson.
Mower.
Nº 15029   Patented Jun. 3, 1856

ALLEN B. WILSON, OF WATERBURY, CONNECTICUT.

IMPROVEMENT IN GRAIN AND GRASS HARVESTERS.

Specification forming part of Letters Patent No. 15,029, dated June 3, 1856.

*To all whom it may concern:*

Be it known that I, ALLEN B. WILSON, of Waterbury, in the county of New Haven and State of Connecticut, have invented a new and Improved Grain and Grass Harvesting Machine; and I do hereby declare that the following is a full, clear, and exact description of the same, reference being had to the annexed drawings, making a part of this specification, in which—

Figure 1 is a transverse vertical section of my improvement, *x x*, Fig. 3, showing the plane of section. Fig. 2 is a detached vertical section of the wheel of the same, *y y*, Fig. 1, showing the plane of section. Fig. 3 is a plan or top view of the same.

Similar letters of reference indicate corresponding parts in the several figures.

My invention consists in the peculiar construction of the cutting apparatus, as will be hereinafter fully shown and described.

To enable those skilled in the art to make and use my invention, I will proceed to describe its construction and operation.

A represents a flat metal bar, one end of which is curved upward, and has an arm, A′, upon it, on which the wheel B is secured.

To the lower portion of the bar A a series of fingers, C, are attached in the usual way. These fingers are of the ordinary taper form and placed at equal distances apart. The upper surfaces of the fingers have recesses made in them, in which recesses strips *a*, of rawhide, wood, india-rubber, or other soft or elastic material, are fitted. These strips are sufficiently thick to extend below the cutting-edges of the cutters D, the strips being equal in width to the fingers. The cutters D are pivoted to the bar A, and have shanks *b* at their back ends, said shanks being fitted in a bar, E, which works in grooves in the back ends of the fingers C. The cutters D are of taper form and have cutting-edges on each side of them. (See Fig. 3.)

F is a plate placed over the bar A and cutters D, a sufficient space being allowed between the bar A and plate F to allow the cutters to vibrate freely.

The inner side of the wheel B has radial projections *c* upon it, (see Figs. 1 and 2, and dotted lines in Fig. 3,) and upon the inner or back part of the arm A′ there is placed a bar, G, said bar having a hole in its center, through which hole the arm passes, a pivot, *d*, passing through the center of the bar and arm. The hole in the center of the bar G is made rather oblong, so that the bar may vibrate upon the arm. To each end of the bar G there is attached a friction roller, *e*, the friction-rollers bearing against the radial projections *c*. To the lower end of the bar G one end of the bar E is attached.

H is a draft-pole, the back end of which is attached by a metal strap, I, to the bar A, adjoining the arm A′.

J is a lever, one end of which is attached to the bar A, and the opposite end is connected to a lever, K, which is pivoted at *f* to the draft-pole H.

L is the driver's seat, attached to the bar A.

The operation is as follows: As the machine is drawn along the radial projections *c* on the inner side of the wheel B will give a vibrating motion to the bar G, and as the bar E is connected to the lower end of this bar G a reciprocating motion will be communicated to the bar E, and the cutters D will work back and forth between the fingers C, the cutters acting against the edges of the soft or elastic strips *a*, and cutting the grass or grain first against one side of the strips *a* and then against the other side, each cutter acting alternately against the sides of the strips on the fingers between which it is placed, the strips *a* preventing the cutting-edges of the cutters from being injured or becoming dull or blunt and forming a bearing for the grass or grain. The driver may at any time elevate or depress the cutters or the bar A by operating the lever K, as shown in red, Fig. 1.

This machine is extremely simple, economical to construct, and the sickle is not liable to clog or choke. The sickle is operated in an extremely simple manner, with but little friction and wear, and there are no parts liable to get out of repair.

Having thus described my invention, what I claim as new, and desire to secure by Letters Patent, is—

The elastic strips *a*, fitted in the fingers C, and arranged substantially as described, for the purpose specified.

ALLEN B. WILSON.

Witnesses:
 THEODORE S. BUEL,
 NORTON J. BUEL.